June 21, 1938.  I. H. CROCKER  2,121,685
DIRECTIONAL SIGNAL
Filed Aug. 21, 1936  2 Sheets-Sheet 1
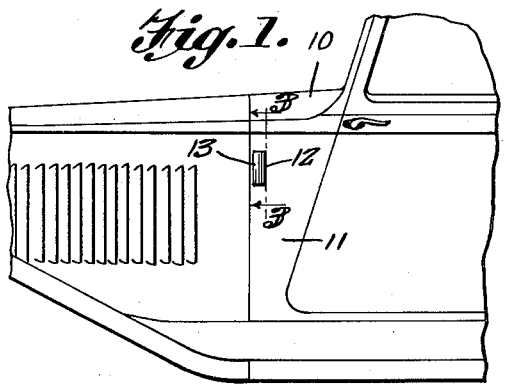
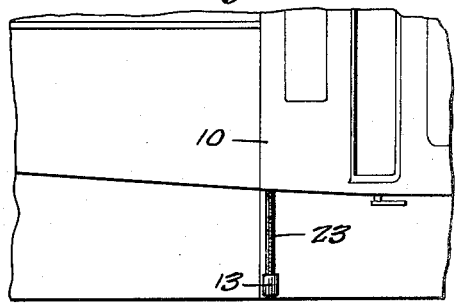
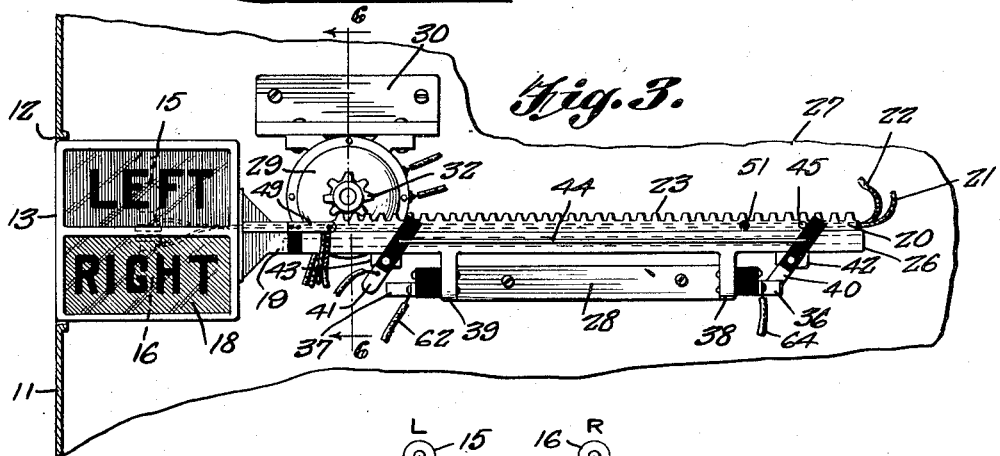
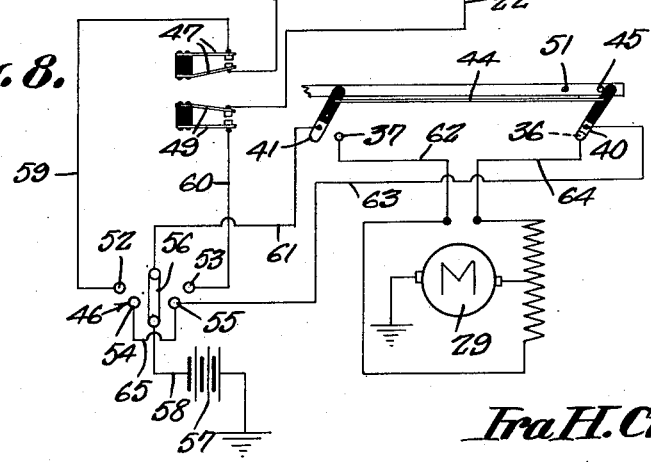
Ira H. Crocker,
INVENTOR
BY Victor J. Evans & Co.
ATTORNEYS

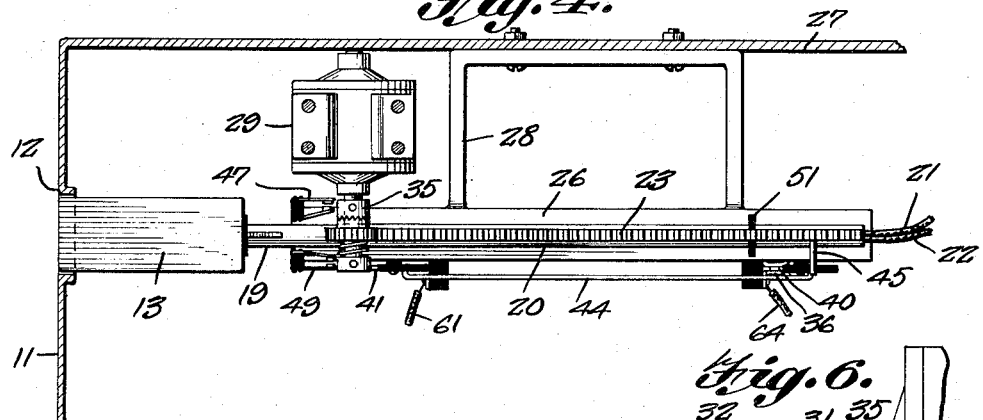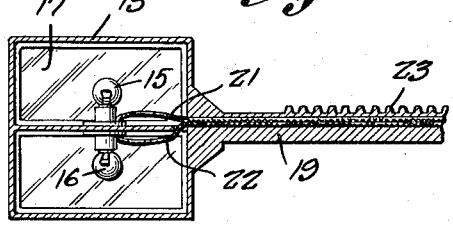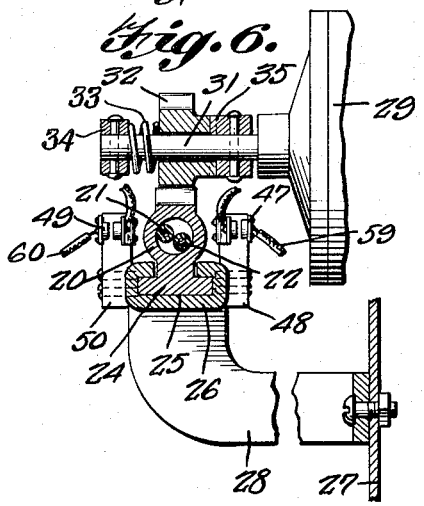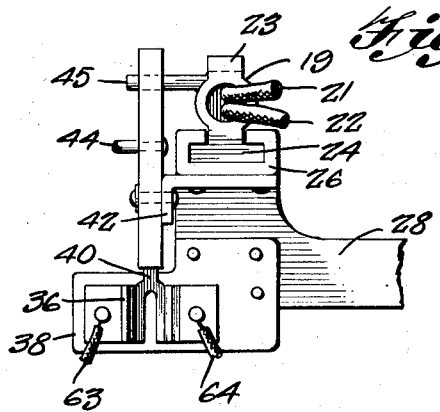

Patented June 21, 1938

2,121,685

UNITED STATES PATENT OFFICE 2,121,685

DIRECTIONAL SIGNAL

Ira H. Crocker, Wilmot, S. Dak.

Application August 21, 1936, Serial No. 97,249

2 Claims. (Cl. 177—329)

This invention relates to directional signals for motor vehicles, and has for an object to provide a signal device which may be concealed underneath the cowl and projected laterally through an opening in the side of the vehicle to display a signal lamp for indicating the intention of a driver to make either a left turn or a right turn.

A further object is to provide novel mechanism for moving the signal lamp to operative and to released position.

A further object is to provide novel means for selectively illuminating the right or the left turn signal bulb when the lamp arrives at extended position, said means automatically extinguishing the bulb at the beginning of retrograde movement of the lamp to concealed position.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a fragmentary side elevation of an automobile showing the signal lamp extended from underneath the cowl.

Figure 2 is a plan view of the parts shown in Figure 1.

Figure 3 is an enlarged cross sectional view taken on the line 3—3 of Figure 1 showing the directional signal apparatus withdrawn to concealed position beneath the cowl.

Figure 4 is a plan view of the parts shown in Figure 3.

Figure 5 is a detail vertical sectional view through the signal lamp and supporting arm.

Figure 6 is an enlarged cross sectional view taken on the line 6—6 of Figure 3.

Figure 7 is an end elevation of the parts shown in Figure 3 looking toward the inner end of the device.

Figure 8 is a diagrammatic view of the electrical connections of the directional signal.

Referring now to the drawings in which like characters of reference designate similar parts in the various views, 10 designates the cowl of a motor vehicle and 11 designates the left side of the body of the vehicle. A substantially rectangular opening 12 is formed in the side 11 underneath the cowl to receive the signal lamp 13.

The signal lamp casing is substantially rectangular in longitudinal section and in cross section and is provided with a central partition which divides the lamp into an upper compartment and a lower compartment. These compartments are provided with respective signal bulbs 15 and 16 that illuminate the front panes 17 and the rear panes 18 of the lamp. The upper rear pane bears the legend "left" to indicate a left turn, and the lower rear pane bears the legend "right" to indicate a right turn. The signal lamps 15 and 16 may be of contrasting colors to correspondingly illuminate the legends, for instance denoting the signal lamp 15 denoting a left turn may be red, and the signal lamp 16 denoting the right turn may be green.

A supporting arm 19 is fixed to the inner end wall of the lamp, as shown in Figure 5, and preferably, as best shown in Figure 6, the arm is formed tubular as shown at 20 to house circuit wires 21 and 22 of the lamp bulbs. The arm is provided on the top with a rack 23 and on the bottom is provided with a T-shaped guide 24 which slidably fits in a similarly shaped groove 25 formed in a track 26 which is secured to the dash 27 of the motor vehicle by a bracket 28, as best shown in Figures 4 and 6.

The motor 29 is secured to the dash by an angle bracket 30, as best shown in Figure 3, and the shaft 31 of the motor is provided with a loose pinion 32 which meshes with the rack 23. A helical spring 33 is mounted on the shaft between the pinion and a stop collar 34 and holds the pinion yieldably clutched to a clutch collar 35 on the shaft, as shown in Figure 6. The pinion thus may slip at either end of movement of the rack to prevent breakage of the parts.

As best shown in Figure 8, the motor 29 is of the reversing type and to reverse the field of the motor for shifting the signal lamp from concealed position to exposed position, and vice versa, switch contacts 36 and 37 are disposed upon, and insulated from, ears 38 and 39 which depend from the stationary track 26, as best shown in Figure 3. Contacts 40 and 41 are pivoted on ears 42 and 43 which depend from the track and these pivoted contacts are connected together for movement as a unit by a rod 44.

A pin 45 projects laterally from the rack 23, as shown in Figure 3, and near the inner limit of movement of the rack moves the contact 40 to circuit closing position and simultaneously moves the contact 41 to open circuit position. Conversely when the rack is moved to its outer limit of movement the pin moves the contact 41 to circuit closing position and moves the contact 40 to open circuit position. Thus the circuit closers are set in proper position to reverse the motor and move the rack to project or withdraw the lamp in accordance with the driver's manipulation of the manually operable switch designated by the numeral 46 in Figure 8, the operation of which will be later described in detail.

A pair of spring contacts 47 are mounted on an insulating block 48 carried by the track, as shown in Figure 6, and form a circuit closer. A second pair of spring contacts 49 are mounted on a block of insulating material 50 fixed to the track opposite the first mentioned circuit closer, and these contacts 49 also constitute a circuit closer.

A pin 51 of insulating material is disposed to project from opposite sides of the rack 23, as shown in Figure 4, and simultaneously closes both the circuit closers 47 and 49 when the rack reaches its outer limit of movement to illuminate the signal lamps selectively as will now be described.

The main control switch 46 may be located on the instrument board within convenient reach of the driver and is provided with two lamp circuit contacts 52 and 53 and with two motor circuit contacts 54 and 55. The pivoted arm 56 when swung in one direction bridges the contacts 52 and 54 and when swung in the opposite direction bridges the contacts 53 and 55.

The switch arm is connected to the battery 57 by a wire 58. The contact 52 is connected to one contact of the circuit closer 47 by a wire 59 while the other contact of this circuit closer is connected to the left signal bulb by the wire 21 previously mentioned. The contact 53 is connected to one contact of the circuit closer 49 by a wire 60 while the other contact of this circuit closer is connected to the right signal bulb by the wire 22, also previously mentioned.

When the switch arm 56 is swung to the left the left signal lamp circuit will be closed at the main control switch and subsequently when the pin 51 moves to its outer limit of movement the left signal lamp circuit will be closed at the circuit closer 47 to energize the left signal bulb the moment the lamp arrives at its extended position. Likewise, when the main control switch arm 56 is swung to the right the right signal lamp circuit will be closed at the main switch and when the pin 51 arrives at its outer limit of movement this circuit will be closed at the circuit closer 47 to illuminate the right signal bulb the moment the signal lamp arrives at its outer limit of movement.

The switch arm 56 is connected by a wire 61 to the pivoted switch contact 41 on the track and a wire 62 connects the associated switch contact 37 with one side of the reversible field of the motor as illustrated. A wire 63 connects the switch contact 55 with the pivoted switch contact 40, and the associated switch contact 36 is connected by a wire 64 with the other side of the reversible field of the motor. A jumper 65 connects both main switch contacts 54 and 55.

When the main switch arm 56 is swung to the left the motor circuit will be closed at the contact 54 and also at the contacts 40 and 36 which are in circuit closing position when the rack is at its inner limit of movement. The motor pinion 32 will advance the rack and signal lamp to the outer limit of movement whereupon the pin 45 will strike the opposite switch contact 41 and through the rod 44 will open the motor circuit at the contacts 40 and 36 so that the signal lamp is halted. The motor circuit is closed at the contacts 41 and 37, however, for a subsequent operation of the motor in a reverse direction when the switch arm 56 is swung to the right to close the motor circuit in the contact 55 and withdraw the lamp to concealed position underneath the cowl.

When the signal lamp is disposed in projected position, that is, at its outer limit of movement beyond the side of a vehicle, the pin 51 will be engaged with and hold both signal circuit closers 47 and 49 closed to maintain the signal lamp, selected at the main switch 46, energized until the driver swings the switch arm 56 back to neutral to close the motor reversing circuit to retract the lamp. When the rack 23 begins its return movement the pin 51 will be withdrawn from between the circuit closers 47 and 49 and permit the circuit closers to open the signal lamp circuits.

Since the operation has been described as the description of the parts progressed, it is thought that the invention will be fully understood without further explanation.

What is claimed is:

1. An electrically operated directional signal for motor vehicles, comprising a signal lamp casing having two compartments on one side of which there are transparent right and left signs, bulbs in the respective compartments for indicating a right and left turn, a rack integral with the lamp casing, a track forming a sliding support for the rack, means for supporting the track on a vehicle, a reversing motor, a pinion driven by the motor engaging the rack, circuits for reversing the motor to project or to retract the lamp casing, circuits for the bulbs, circuit closers for the bulb circuits operated by the rack at its outer limit of movement to close the bulb circuits and operated upon the beginning of retracting movement to open the bulb circuits, circuit closers operated by the rack for controlling the motor circuits to reverse the field of the motor at each limit of movement of the rack, and a manually operable switch in the bulb circuits and in the motor circuits having two operative and one neutral position, in either operative position the projecting circuit of the motor being energized while in the neutral position the retracting circuit is energized.

2. An electrically operated directional signal for motor vehicles which are provided with an opening in the side, comprising a signal lamp having compartments displaying transparent right and left signs, said casing being adapted to be normally concealed within the vehicle adjacent to said opening, a rack connected to the lamp casing, a track forming a sliding support for the rack, means for securing the track to the vehicle, an electric motor having a pinion engaging the rack for projecting the lamp casing outwardly through said opening in the side of the vehicle, distinctively colored bulbs in the lamp casing indicating respectively a right turn and a left turn, circuits for the bulbs, switches in the circuits, a circuit closer on the rack for selectively closing the switches at the outer limit of movement of the rack, said motor having a reversing field, circuits for reversing the field of the motor to project and to retract the lamp casing, circuit closers operated alternately by movement of the rack at either limit of its movement to open one and close the other of said motor circuits, and a manually operable switch in the bulb circuits and in the motor circuits having two operative and one neutral position, in either operative position the projecting circuit of the motor being energized while in the neutral position the retracting circuit is energized.

IRA H. CROCKER.